United States Patent

Dorfschmid et al.

[11] Patent Number: 5,979,261
[45] Date of Patent: Nov. 9, 1999

[54] POSITIONING DEVICE FOR SHIFTING GEARS IN A TRANSMISSION HAVING AN OUTPUT COMPONENT CAPABLE OF TWO TYPES OF MOTION

[75] Inventors: Jens Dorfschmid, Schonungen; Lutz Leimbach, Schweinfurt; Thomas Wirth, Schwanfeld; Erwin Bair, Grafenrheinfeld; Ingo Franz, Mainberg, all of Germany

[73] Assignee: Mannesmann Sachs AG, Schweinfurt, Germany

[21] Appl. No.: 08/927,431

[22] Filed: Sep. 11, 1997

[30] Foreign Application Priority Data

Sep. 23, 1996 [DE] Germany ............................ 196 38 938
Feb. 10, 1997 [DE] Germany ......................... 296 22 669 U
Feb. 18, 1997 [DE] Germany ............................ 197 06 214

[51] Int. Cl.⁶ ............................ B60K 20/00; F16H 27/02
[52] U.S. Cl. .................... 74/473.12; 74/89.17; 74/89.18; 74/89.19
[58] Field of Search ............................ 74/473.12, 473.11, 74/89.17, 335, 89.18, 89.19

[56] References Cited

U.S. PATENT DOCUMENTS

| | | | |
|---|---|---|---|
| 2,634,622 | 4/1953 | Cripe ........................................... | 74/335 |
| 4,745,822 | 5/1988 | Trachman et al. ............... | 74/473.12 X |
| 4,813,303 | 3/1989 | Beezer et al. ............................. | 74/425 |
| 4,873,881 | 10/1989 | Edelen et al. ............................. | 74/335 |
| 5,357,822 | 10/1994 | Lanting et al. ............................ | 74/335 |
| 5,623,852 | 4/1997 | Tischer et al. . | |
| 5,689,997 | 11/1997 | Schaller ............................ | 74/473.12 X |

FOREIGN PATENT DOCUMENTS

| | | | |
|---|---|---|---|
| 0 545 597 | 6/1993 | European Pat. Off. ........ | F16H 61/28 |
| 0 592 170 | 4/1994 | European Pat. Off. ........ | F16H 61/12 |
| 2 280 004 | 1/1995 | European Pat. Off. ........ | F16H 61/28 |
| 42 38 368 A1 | 11/1992 | Germany ........................ | B60K 23/02 |
| 43 11 855 A1 | 4/1993 | Germany ........................ | F16H 59/04 |
| 58-166155 | 10/1983 | Japan . | |
| 58-171-533 | 11/1983 | Japan . | |
| 58-191354 | 11/1983 | Japan . | |
| 60-31537 | 3/1985 | Japan . | |
| 63-30637 | 2/1988 | Japan . | |
| 1-105045 | 4/1989 | Japan . | |
| 2-271164 | 11/1990 | Japan . | |
| 3-99271 | 10/1991 | Japan . | |
| 2 207 715 | 2/1989 | United Kingdom . | |

*Primary Examiner*—Tamara L. Graysay
*Assistant Examiner*—Marcus Charles
*Attorney, Agent, or Firm*—Cohen, Pontani, Lieberman & Pavane

[57] ABSTRACT

A positioning device for an output component for automatically shifting gears of a motor vehicle transmission that undergoes two types of movements comprises a plurality of drives. The movement of each drive can be transmitted via a transmission mechanism to the output component. A first drive causes the output component to undergo movement of a first type, and a second drive causes the output component to undergo movement of a second type. The first drive is connected to a sliding element. The sliding element is axially fixed, but movable in the circumferential direction relative to the output component. The second drive is rotatably fixed, but axially movable output component.

20 Claims, 15 Drawing Sheets

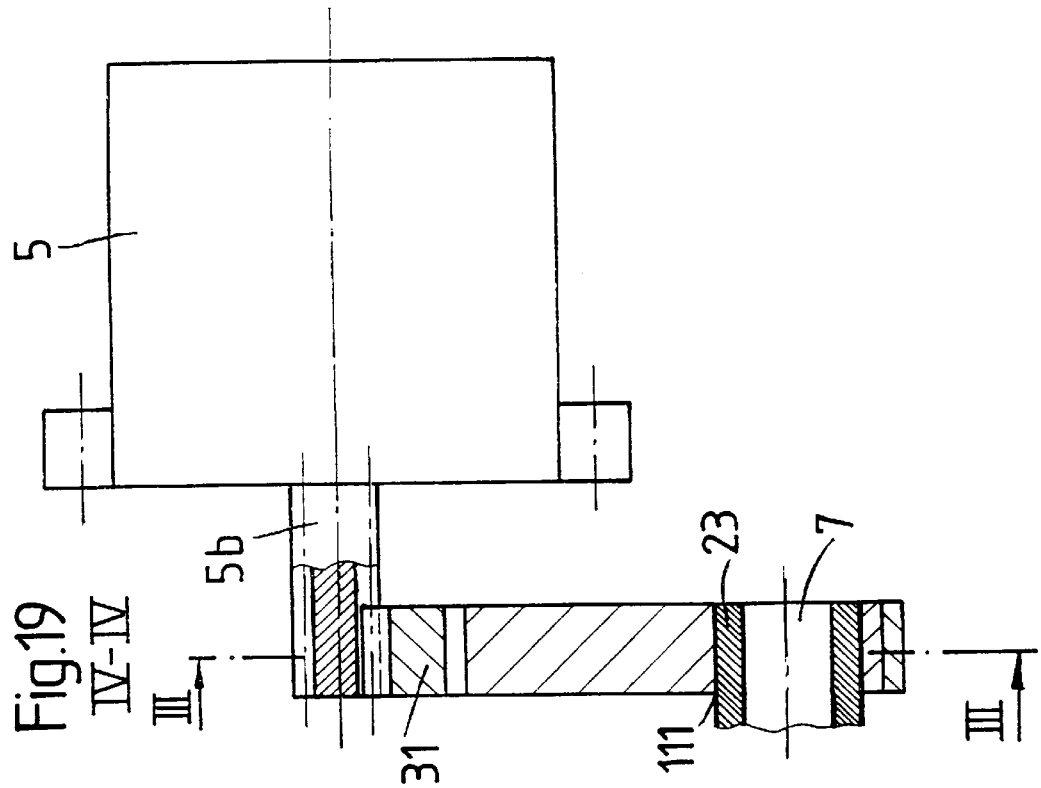
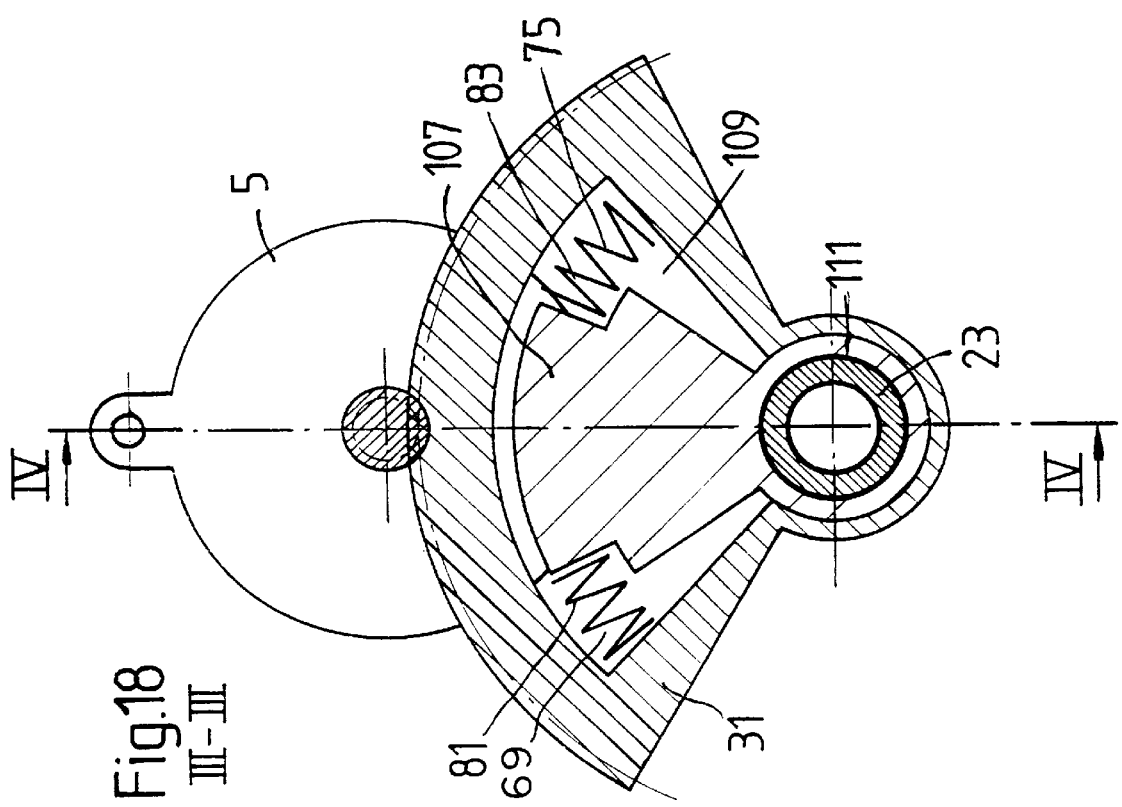

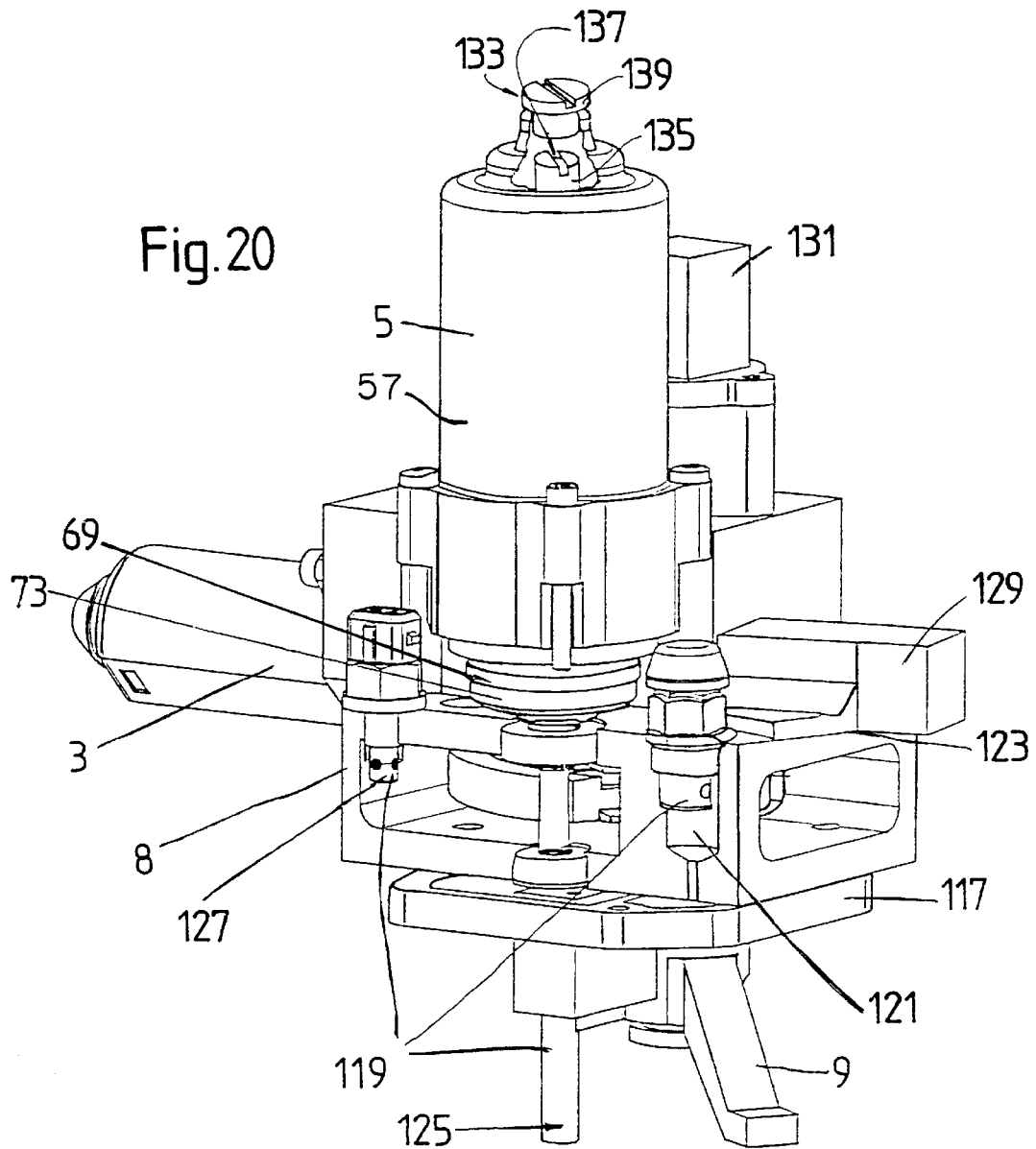

POSITIONING DEVICE FOR SHIFTING GEARS IN A TRANSMISSION HAVING AN OUTPUT COMPONENT CAPABLE OF TWO TYPES OF MOTION

BACKGROUND OF THE INVENTION

1. Field of the Invention

The present invention relates to a positioning device which moves an output component to a position using two separate types of motion. More specifically, the present invention relates to a positioning device for automatically shifting gears in an transmission of a motor vehicle.

2. Description of the Related Art

According to DE 43 11 855 A1, a positioning device is known for positioning a gearshift lever shaft of a transmission of a motor vehicle by using two drives for two separate types of motion. In this positioning device, a first drive is arranged vertically relative to a second drive. As FIG. 19 of that reference shows, the twisting or rotating of the gearshift lever shaft is produced by the first drive. The first drive linearly drives a gear rack, which engages a gear wheel. The gear wheel is fixedly connected to the gearshift lever shaft. An axial sliding of the gearshift lever shaft is effected by the second drive. To transmit the sliding movement, the second drive is actively connected to the gearshift lever shaft, so that the linear movement of the second drive is transmitted directly to the gearshift lever shaft.

Because of this sliding movement, the gear wheel that is fixedly connected to the gearshift lever shaft to transmit the rotary movement must be long enough axially to ensure that the gear rack and the gear wheel remain engaged throughout the entire linear movement of the gearshift lever.

A problem with this transmission mechanism, is that the teeth of the gear wheel are constantly engaged with the teeth of the gear rack and rub against each other when the gearshift lever shaft is shifted. This causes a heavy stress on the gear teeth. The teeth become worn, increasing the play between the engaged teeth. Particularly when positioning devices for positioning a gearshift lever shaft of a transmission are used, operability must be ensured for many shifting procedures. For this reason, the transmission mechanism described above is unsuitable for use in positioning the gearshift lever shaft of a transmission.

SUMMARY OF THE INVENTION

It is an object of the present invention provide a positioning device which can move an output component through two different types of motions that is both compact and results in low-wear of parts, thereby ensuring operability of the positioning device over a long period of use.

In the present invention, the first drive is guidingly connected to a sliding element that is movable in an axial direction relative to the output component, for transmitting linear movement in the axial direction to the output component. In turn, the output component is connected in rotation-proof but axially movable fashion to the second drive. When the second drive is operated, rotational movement is transmitted to the output component by the second drive. The two types of movement can be transmitted separately to the output component. The output component is embodied in such a way that the sliding element is not disturbed when rotational movements of the output component are effected by the second drive.

Both linear and rotary type drives can be used for the first drive and the second drive. When two drives that work in the same manner are used, it is necessary, due to the aforementioned two types of movement on the output component, to use a transmission to convert one type of movement initiated by the drives into the other type. It has proved advantageous to drive the sliding element by a rotary drive. A drive of this type and the sliding element are actively connected, for example, via a transmission element that converts the rotational movement of the drive into a linear movement. To permit the smallest possible drive to be used, it is advantageous to provide a transmission element that acts as a reduction gear. One method of converting rotational linear motion to linear motion is the use of a crank gear. To set different axial positions of the output component, different positions that are associated with the desired axial positions of the sliding element, and thus of the output component, are approached by the first drive. If the crank drive were driven in one direction only, then two crank gear positions would be associated with each axial position of the sliding element. For unambiguous association, the crank gear is therefore preferably driven in oscillating fashion.

A gear rack is another possible transmission element that can be provided for converting a rotary movement into a linear movement. The gear rack is driven linearly by means of the output element of the first drive. When a gear rack is used as a transmission element, it is advantageous for the gear rack to be embodied as a single part with the sliding element. This transmission element represents an especially simple and economical construction. Very little structural space is required by the gear rack, and this is advantageous for a compact design.

The use of a cam gear as a transmission element has also proved advantageous. The cam gear can have plateaus, slightly elevated in the radial direction, each of which is associated with a particular shift position of the sliding element. In this way, the sliding element and thus the output component can be set very accurately, for example, to the shift positions associated with the channels of the motor vehicle transmission to which the output component is connected.

Another embodiment of the present invention includes a reset spring urging the sliding element against the transmission element, the sliding element is deflected against the force of the reset spring by means of the drive. Such reset springs make it possible, first of all, to keep the sliding element and the gear in active connection by means of force locking, and secondly, to produce a return movement of the sliding element by the action of the reset spring upon said element. For this purpose of the return movement, it is necessary that the drive be shifted into a free-wheeling state.

The sliding element is mounted in a sleeve, which has an opening extending parallel to the sliding direction. This opening is penetrated by a radial projection of the sliding element, and the projection is connected to the output component. The provision of this sleeve for the purpose of mounting reduces the load on the sliding element and prevents wear from friction. The smooth surfaces of the sleeve and sliding element slide against each other. The sleeve surrounds the sliding element, so that a compact design is achieved. It is preferable for the opening extending in the slide direction to be just large enough in the circumferential direction that the radial projection of the sliding element slides in the opening in this direction without play. As a result, the radial projection of the sliding element is supported by the shape of the opening extending in the sliding direction, which helps to relieve stress on the sliding element.

In another embodiment, a lifting magnet is used as the first drive. The lifting magnet is especially suitable for setting the desired channel position, the adjusting of which requires less force than engaging a gear. It has proved advantageous to select the different channels by a sliding movement of the output component, because the lift movement produced by the lifting magnet can then be transmitted to the sliding element. When a transmission is used, however, it is also possible to use the lifting magnet for channel selection by a rotational movement.

To establish the connection of the second drive to the output component, a gear wheel is rotatably mounted on the sleeve. Suitable mounting minimizes the friction force that acts during a rotational movement. The gear wheel is mounted in rotation-proof but axially movable fashion relative to the output component. The gear wheel is fixed in the axial direction of the sliding element, relative to the second drive, so that no wear occurs on the teeth in the axial direction.

To minimize the structural area required, a segmental gear wheel is provided for connecting the second drive to the output component. The angular area of the segmental gear wheel is adjusted to correspond to the rotational angular area requirements of the output component.

In an advantageous further development, a compensation spring is associated with the second drive. In a rest position of the second drive, the compensation spring has a maximum prestress. When the compensation spring is deflected from this rest position, the torque of the drive is reinforced by the relaxation of the spring. The use of such a compensation spring makes it possible to support the engaging of a gear. Engaging a gear requires considerable resistance because of the synchronization work that must be performed. Since the compensation spring reinforces the second drive, a low-power drive is used. When an engaged gear is taken out of gear, no synchronization work must be performed, so that support by the compensation spring is not needed. However, the power of the second drive must be selected in such a way that the compensation spring again has the maximum prestress at the rest position. The rest position, in which the compensation spring has the maximum prestress, is associated with the neutral position of the gearshift lever shaft.

It has also proved advantageous for the drive or drives to have overload protection. This overload protection can be activated in the event of faulty control at the drive to prevent the transmission or continuation of the drive movement of a transmission element when a stop associated with this transmission element is reached. When the drive is an electric motor, for example, the drive is thus protected against an overload that could lead to overheating of the electric motor. Furthermore, the mechanical load of the components approaching or at a stop is reduced, preventing an excessive mechanical load that could lead the components to fail.

It has proved advantageous to provide a slip clutch as the overload protection. Such slip clutches can be integrated into an electric motor. When a stop is reached, the slip clutch is activated by the continued drive in the prevailing direction of movement. Sensors for detecting the movement initiated by the electric motor are advantageously arranged after the slip clutch, so that the actual activating movement and position are detected.

In a further embodiment the overload protection has elastic elements. When predetermined deflection positions are exceeded, these elastic elements undergo elastic deformation, counter to the force initiated by the drive, for the purpose of absorbing the movement of the transmission element. Maximum deflection in a prevailing movement direction can therefore occur only in a damped form of movement.

In a further embodiment of the present invention, a single positioning drive transmits two types of movement to the output component. A shift mechanism is used for shifting between the two types of motion. As a result, the costs and structural area for a second drive for activating operate the output component are saved. A shift drive for shifting the shift mechanism is required. However, a drive with very low power and thus an extremely compact design suffices as the shift drive.

The shift mechanism includes a locking element. The locking element blocks one of the two types of movement, so that the output component can be driven by the positioning drive only in the non-blocked type of movement. The locking element has a first claw, which engages into a first depression of the output component without play in the axial direction for the purpose of locking the output component. As a result, the output component is blocked against sliding movements by the first claw. The locking element also has a second claw, which engages into a second depression of the output component without play in the circumferential direction for the purpose of locking the output component against movement around its rotational axis.

The first claw has associated with it a plurality of depressions, and one channel of the transmission connected after the output component is defined by each depression.

A large active torque causes a gear to be engaged quickly. It has been found advantageous for the second claw to always remain in the second depression. To release the lock, the second claw can be moved into a position in which the second depression is larger, in the circumferential direction, than the second claw. This enlargement of the second depression permits the rotational movement of the output component.

In another embodiment, the second depression is embodied in the shape of a gap, whereby, for the purpose of allowing rotational movement, the second claw is positioned onto the position of the rotational axis of the output component. In this embodiment, as soon as the second claw is positioned in a position that deviates from the rotational axis of the output component, the output component is blocked against rotational movements. This makes it especially simple to shift between the movement types without an overlap between them. The output component is always exclusively driveable in the direction of one movement type only, i.e., rotary or linear.

The positioning drive is connected to the output component of the positioning device via a helical gearing. This helical gearing allows both a rotary and a linear movement to be simply transmitted to the output component of the positioning device. The transmission known from DE 42 38 368 A1 has proved to be especially suitable as the transmission.

The use of electric motors that are available as economical standard components as the drives has proved to be especially advantageous. Such electric motors are rotary driven. The power required for their operation can be taken from a generator driven by the internal combustion engine of the vehicle. In contrast, hydraulically-driven positioning devices have the disadvantage that a separate hydraulic system, which includes a pump, a pressure storage device and a plurality of valves, must be provided to operate the positioning device. The cost of providing the required hydraulic power is therefore considerable. In addition, due to the leakage always found in hydraulic systems, the energy requirement is substantially greater than in an electrical system.

A further advantage of using electric motors is that the power connection lines are simple to run and require little space.

In an especially advantageous further development, the positioning drive is connected to a flange to be connected to the transmission. The flange serves to accommodate auxiliary elements that permit further functions. The flange is embodied in such a way as to close the opening provided for the gear-shift lever to pass through in a manually shifted vehicle. As a result, the actuator can be used without any modification to the gear housing being required. In addition, a closeable aperture for the inflow and outflow of transmission oil can be provided in the flange, as can apertures for sensors. It has proved advantageous to detect the temperature of the transmission or its environment, so that the increase in force required to engage a gear as the temperature drops can be taken into account in controlling an automatic shift process. It is also possible to integrate a sensor for detecting the main gearshaft speed, which is used in many vehicles for control purposes (e.g., EKS). It is advantageous to arrange the auxiliary devices centrally on the flange, so that the required incoming and outgoing lines can be run to the flange in bundles, which is advantageous for manufacture.

At least one drive includes a device that allows the manual adjustment of the output component of the drive. This makes it possible, when there is a disabled vehicle in which the electronics system has failed and which is in gear, to take the vehicle out of gear manually. The transmission is shifted to a no-load state and the vehicle can be towed as usual by a driveable vehicle. However, before the disabled vehicle is taken out of gear, its hand brake must be activated, so as to prevent the vehicle from rolling when taken out of gear.

It is also possible for both drives to be equipped with a device for manual operation, by means of which the drives can be deflected in the movement direction driven during normal operation. It thus becomes possible to place the vehicle into gear manually, particularly into a start-up gear.

It has proved advantageous for the end of the motor shaft of the drive that faces away from the output component to be equipped with a specially shaped profile. Engaging into this profile is a counter-profile of a positioning element, preferably a tool that is carried in the vehicle. This device can, however, also be arranged at another location. In some circumstances, it is advantageous to select an easily accessible predetermined location, so that under certain circumstances a transmission can be required for a power turn.

The output component can be placed into the desired position, preferably the idle position, by means of manual drive. The desired position can be identified by the positioning force that must be expended. For example, putting a vehicle into gear and taking it out of gear requires more force than adjusting the output element in the idle range. The idle position can thus be identified by easy manual operation.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 11a is a sectional view of the positioning device of FIG. 11 along line A—A;

FIG. 18 shows another embodiment of the segmental gear wheel with a stop absorption;

FIG. 19 is a sectional view of the segmental gear wheel of FIG. 18 along line IV—IV; and FIG. 20 is a perspective view of the positioning device of the present invention with a flange and auxiliary elements.

DETAILED DESCRIPTION OF THE PRESENTLY PREFERRED EMBODIMENTS

Figure 1:
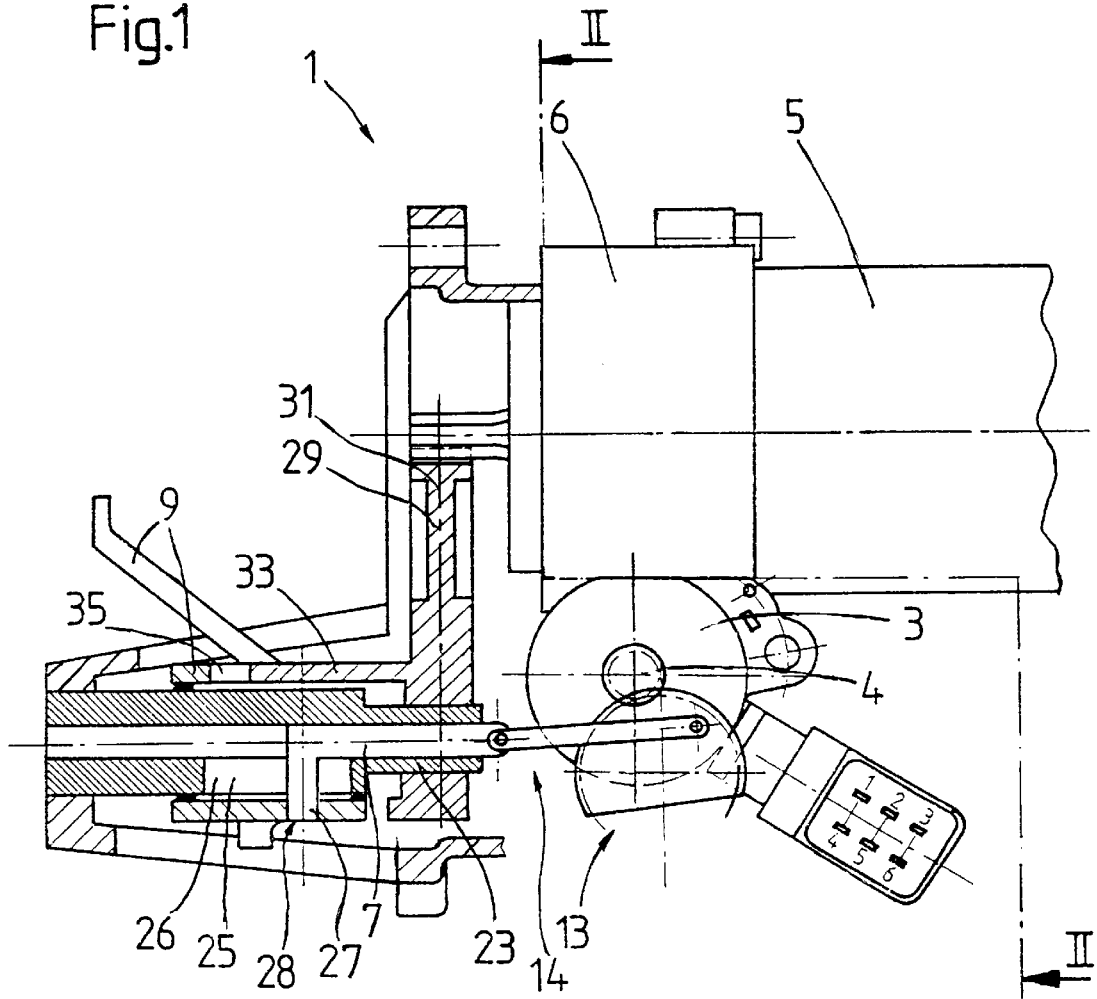
FIG. 1 is an elevational view of the positioning device of the present invention with a crank gear, perpendicular to the longitudinal axis of the positioning device.
Figure 2:
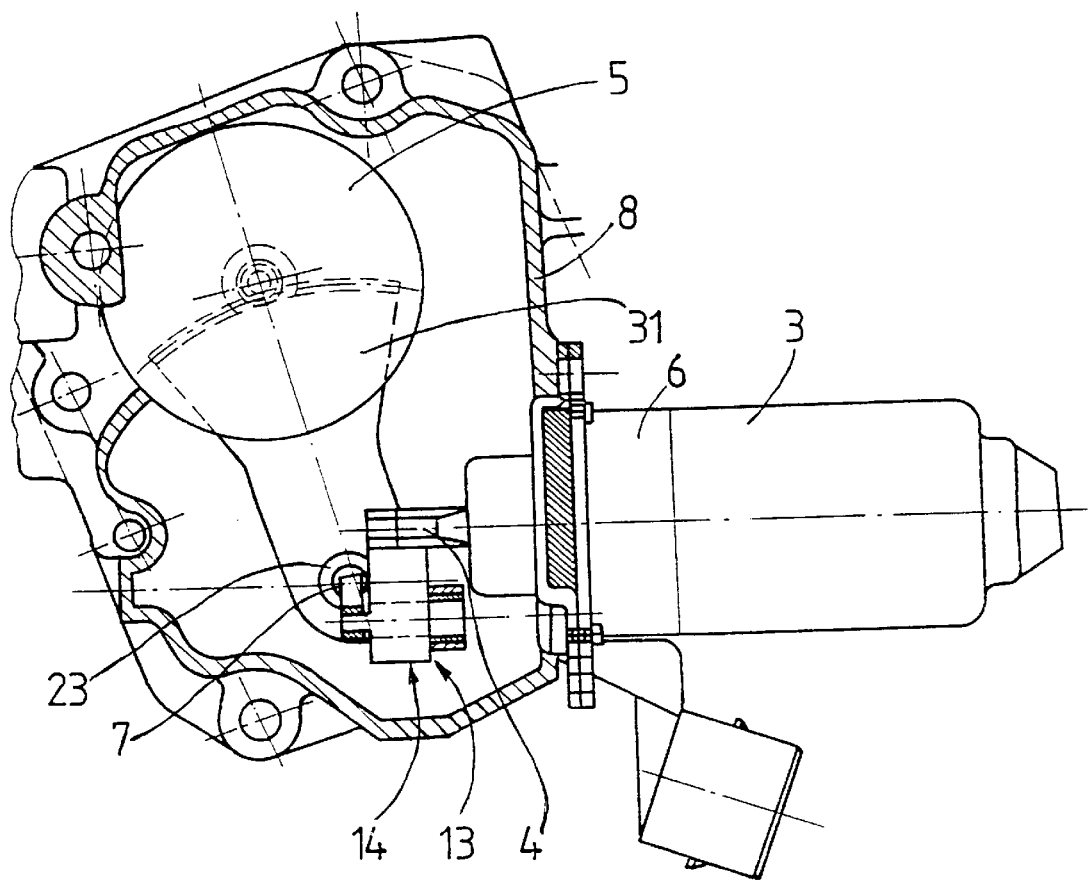
FIG. 2 is a sectional view of the positioning device of FIG. 1 along line II—II.

Referring to FIGS. 1 and 2, the basic structure of a positioning device 1 is described. A positioning device 1 includes a first drive 3, which is connected via a crank gear 14 to a sliding element 7. The sliding element 7 is mounted in a sleeve 23 and has at its end a radial projection 27, which penetrates an opening 25 provided in the sleeve 23 into a radial gap 28, running along a circumferential direction of an output component 9. The opening 25 in the sleeve 23 is a gap 26 running in the axial direction.

The output component 9 also has an axial opening 35, into which engages an axial projection 33 of a segmental gear wheel 31 mounted on the sleeve 23. The segmental gear wheel 31 is engaged via toothing with a gear rack of a second drive 5 that acts via a reduction gear 6.

The function of the positioning device 1 is described in what follows. This positioning device 1 can be used for the automatic positioning of a gearshift lever shaft of an automobile transmission, which here is the output component 9 of the positioning device 1. The first drive 3 operates with an oscillating movement and drives a crank gear 14. The crank gear 14 is connected to the sliding element 7, which carries out a linear movement. The linear movement of the sliding element 7 is transmitted to the output component 9 via the radial projection 27, whereby the sliding element 7 slides in the sleeve 23 wherein it is mounted. The radial projection 27 of the sliding element 7 is supported in the circumferential direction by the opening 25 running in the axial direction in the sleeve 23. The linear movement transmitted to the output component 9 serves to engage the desired channel of the transmission. Gear selection is carried out by a rotational movement of the output component 9 (the gearshift lever shaft). The required rotational movement is initiated by the second drive 5. The second drive 5 drives the segmental gear wheel 31. The rotational movement of the segmental gear wheel 31 is transmitted to the output component 9 via an axial projection 33, which engages an axial opening 35 on the output component 9. The output component 9 and the segmental gear wheel 31 are axially movable relative to one another, so that a linear movement transmitted to the output component 9 has no influence on the position of the segmental gear wheel 31. The sliding element 7 is also connected in rotatable fashion to the output component 9, so that a rotational movement of the output component 9 initiated by the second drive 5 has no influence on the sliding element 7. Greater force is required to engage the desired gear than for channel selection, so that a more powerful drive is necessary for this purpose. So that the smallest drive possible can be used, this drive can be equipped with a reduction gear 6.

The first and second drives 3 and 5 are connected fixedly to a housing 8, which in turn is connected fixedly with a flange (such as flange 117 on FIG. 20) on the gearbox, which closes the opening formerly provided for a manual gear-shift lever (stick shift) to pass through. The flange and the housing 8 can also be simply embodied as a single piece.

Figure 3:
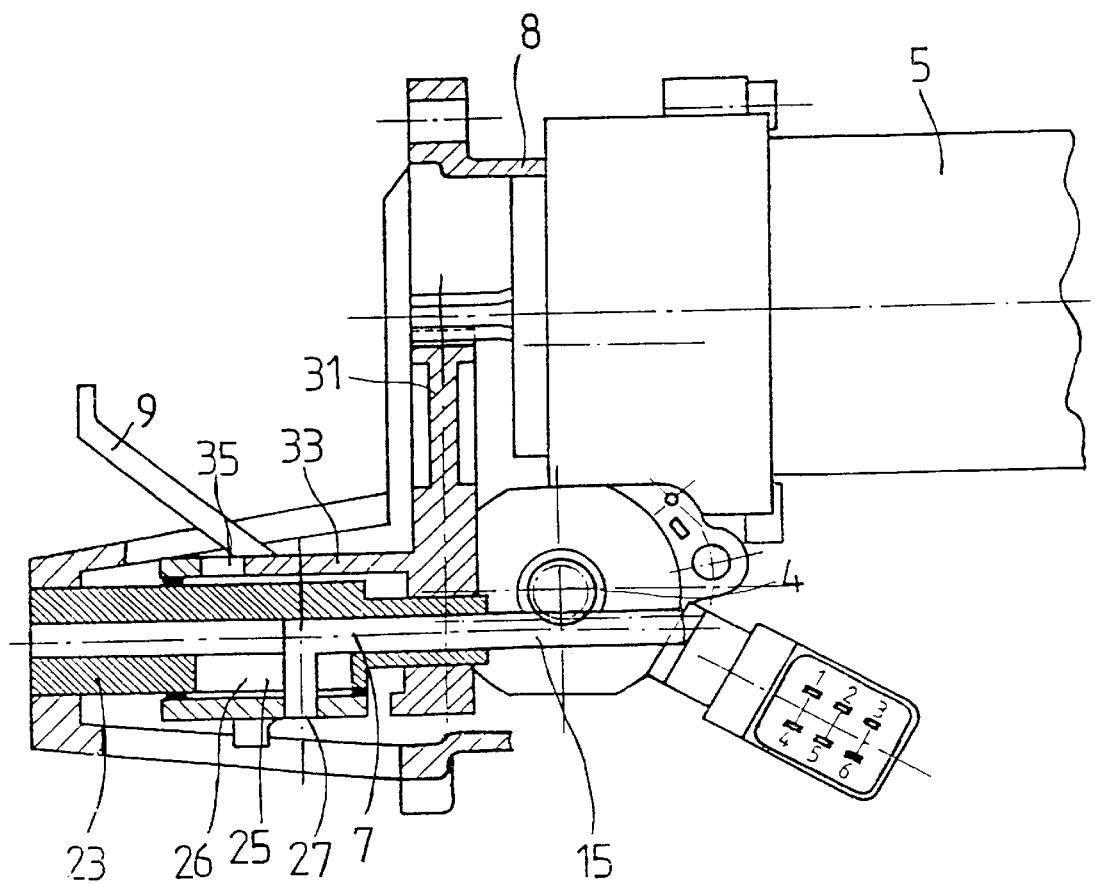
FIG. 3 shows the positioning device of FIG. 1 with a gear rack.

The positioning device 1 shown in FIG. 3 for positioning the gearshift lever shaft 10 (which is the same part as output component 9) corresponds substantially to that described in reference to FIG. 1. The difference is that instead of the crank gear 14, a gear rack 15 is provided. This gear rack 15 is driven by the first drive 3 in a linear movement, which is transmitted to the sliding element 7. In the example shown, the sliding element 7 and the gear rack 15 are embodied as a single piece. An output element 4 of the first drive, which works in rotary fashion, engages into the gear rack 15. The rotation of the output element 4 of the first drive 3 moves the gear rack 15 in the axial direction.

Figure 4:
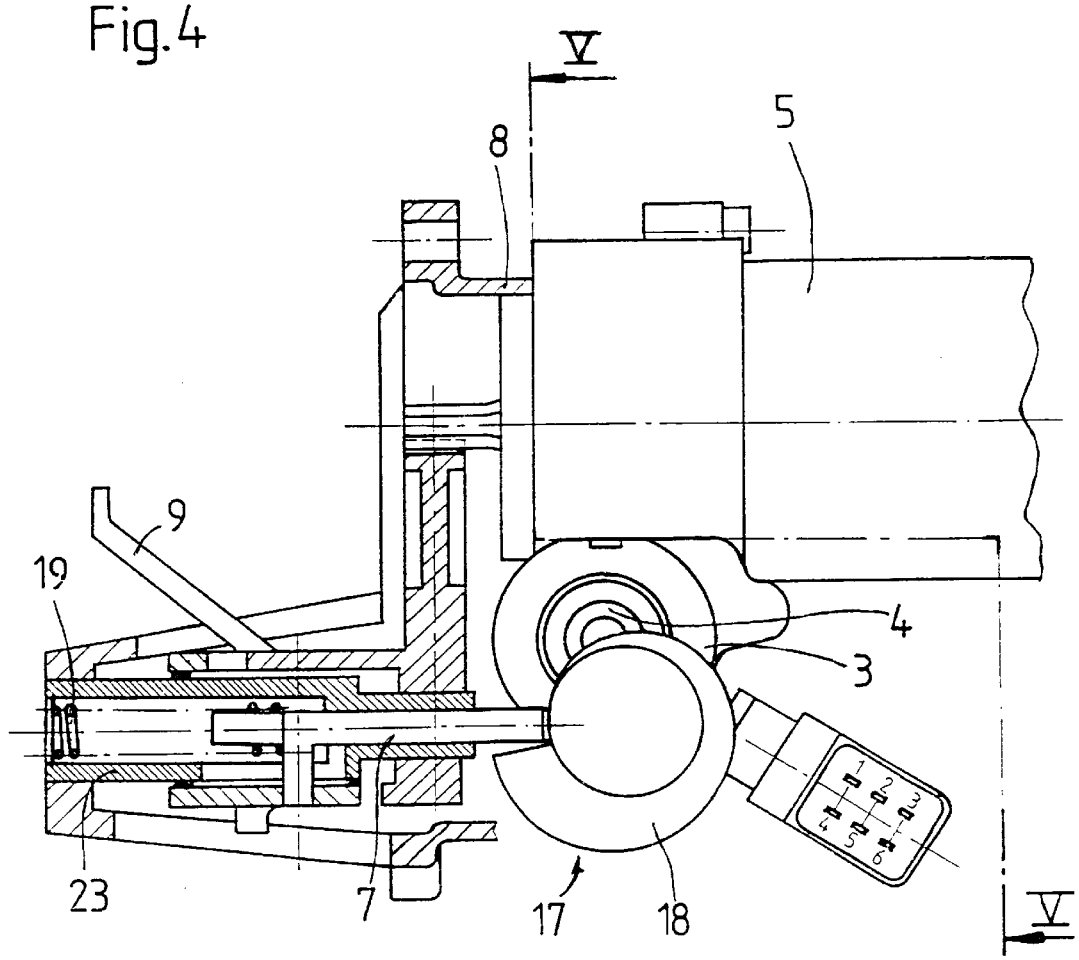
FIG. 4 shows the positioning device of FIG. 1 with a cam gear.
Figure 5:
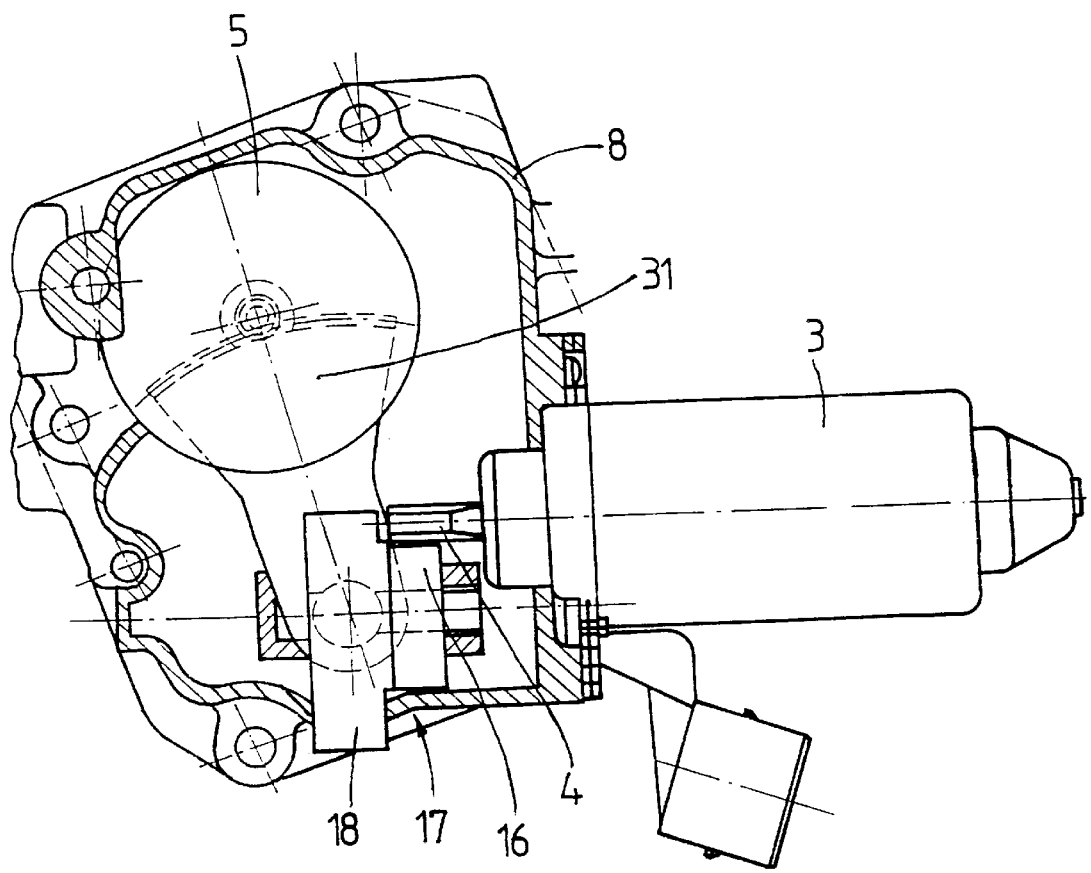
FIG. 5 is a sectional view of the positioning device of FIG. 4 along line V—V.

FIGS. 4 and 5 show a positioning device in which a cam gear 17 is used with the first drive 3. The rotating output element 4 of the first drive 3 engages a gear wheel 16, which is fixedly connected to a cam 18 or is embodied with the latter as one piece. The end of the sliding element 7 runs to this cam 18, and the sliding element 7 is connected to the cam 18 in a force-locking manner by a reset spring 19. However, it is also possible to establish the active connection between the cam 18 and the sliding element 7 via a groove-claw connection.

Figure 4A:
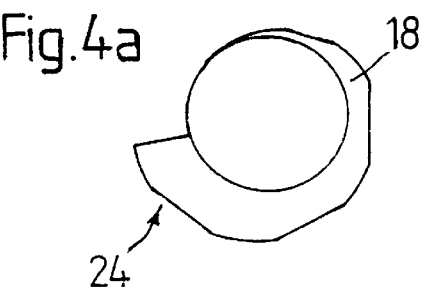
FIG. 4a shows the cam gear of FIG. 4.

FIG. 4a shows the cam 18 with several plateaus 24. Each of these plateaus 24 is associated with one channel.

Figure 6:
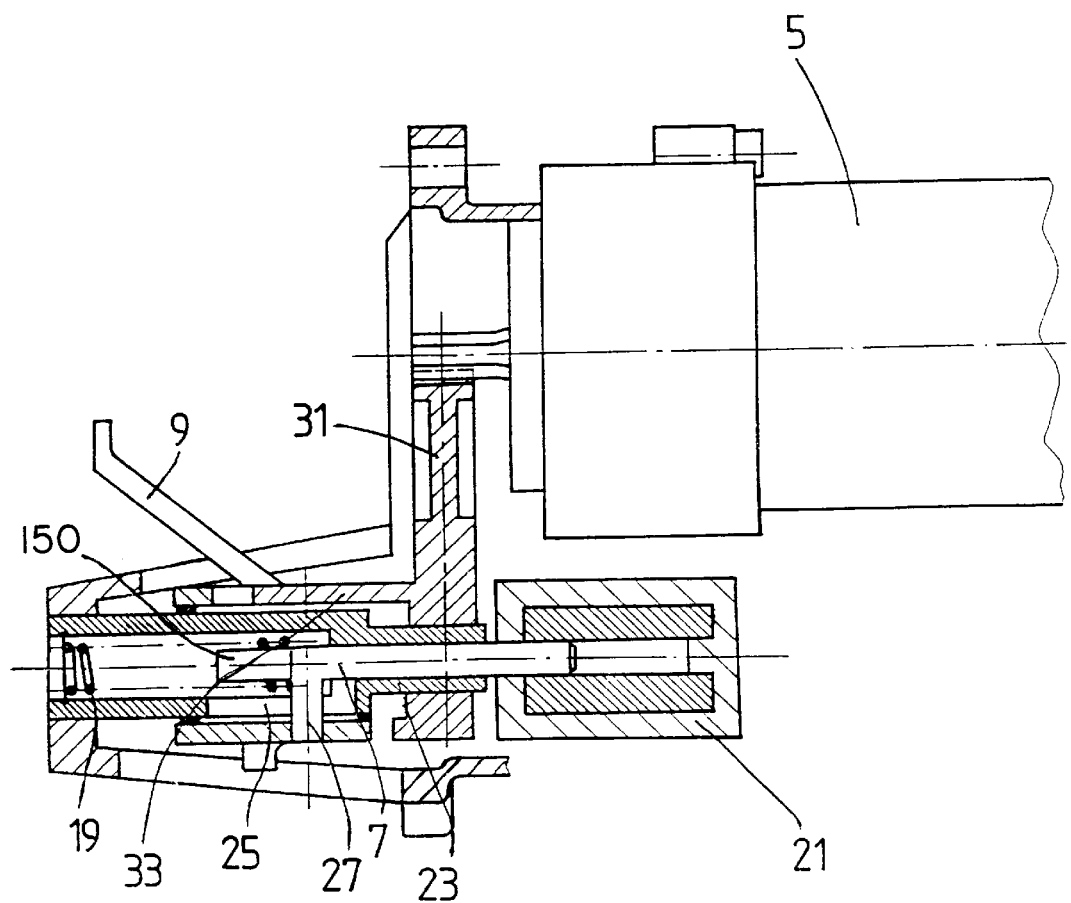
FIG. 6 shows the positioning device of FIG. 1 with a lifting magnet.
Figure 7:
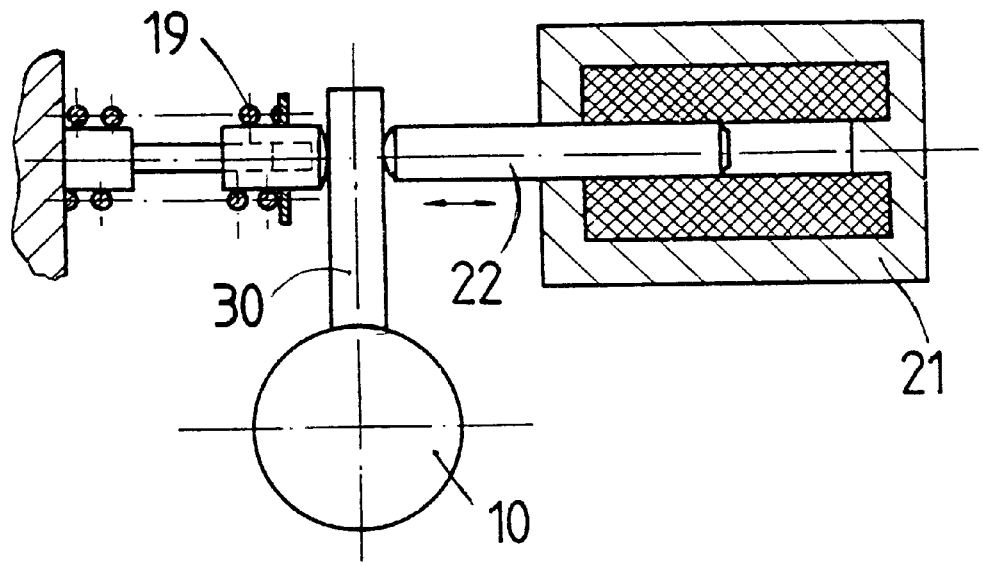
FIG. 7 shows a lifting magnet arrangement for producing a swivel motion.
Figure 8:
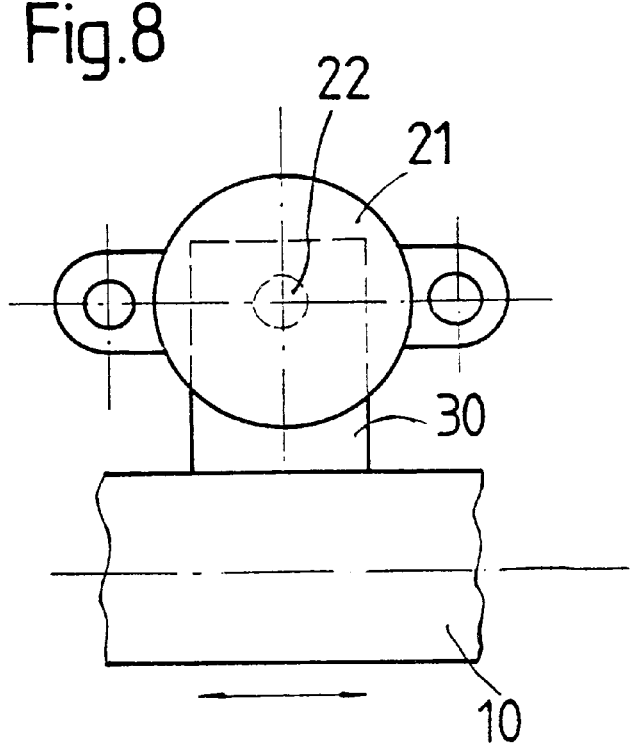
FIG. 8 is a side view of the lifting magnet of FIG. 7 viewed from the right.
Figure 9:
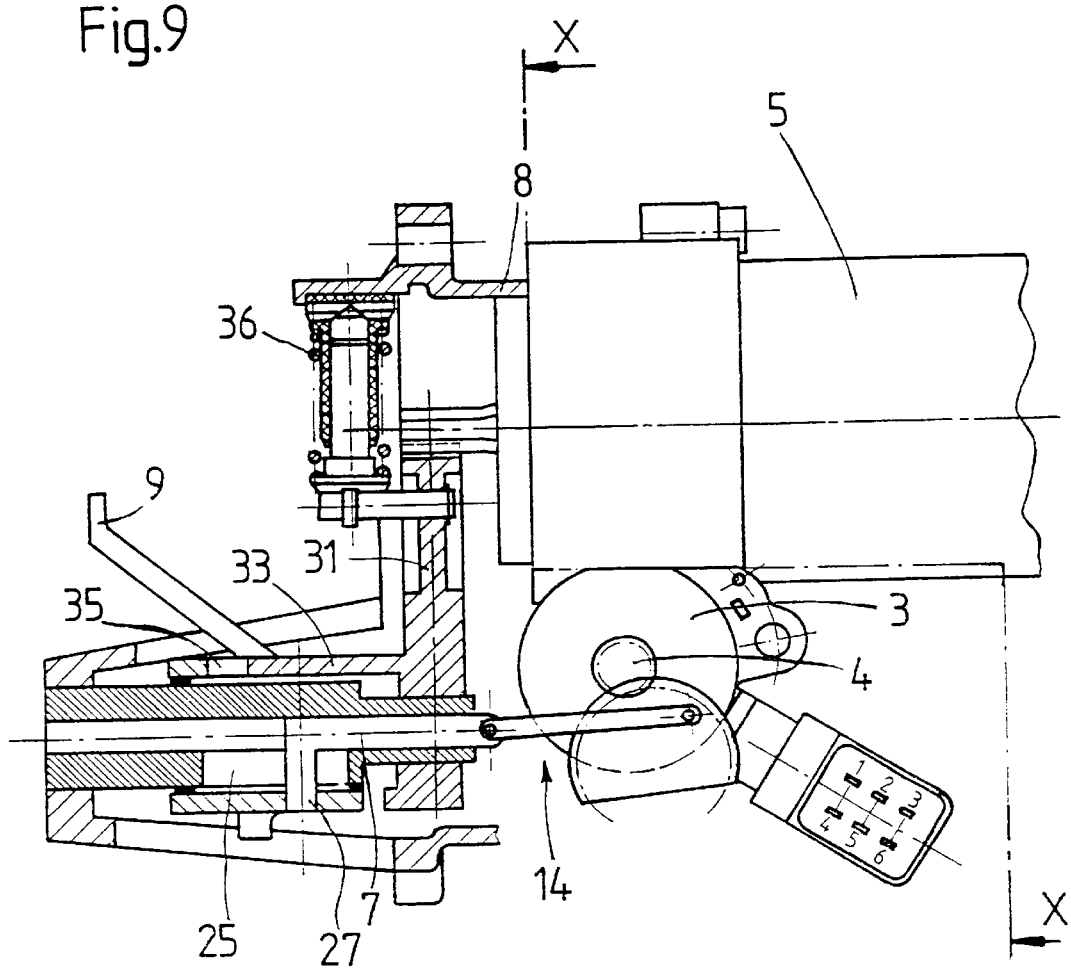
FIG. 9 shows the positioning device of FIG. 1 with a compensation spring on the second drive.
Figure 10:
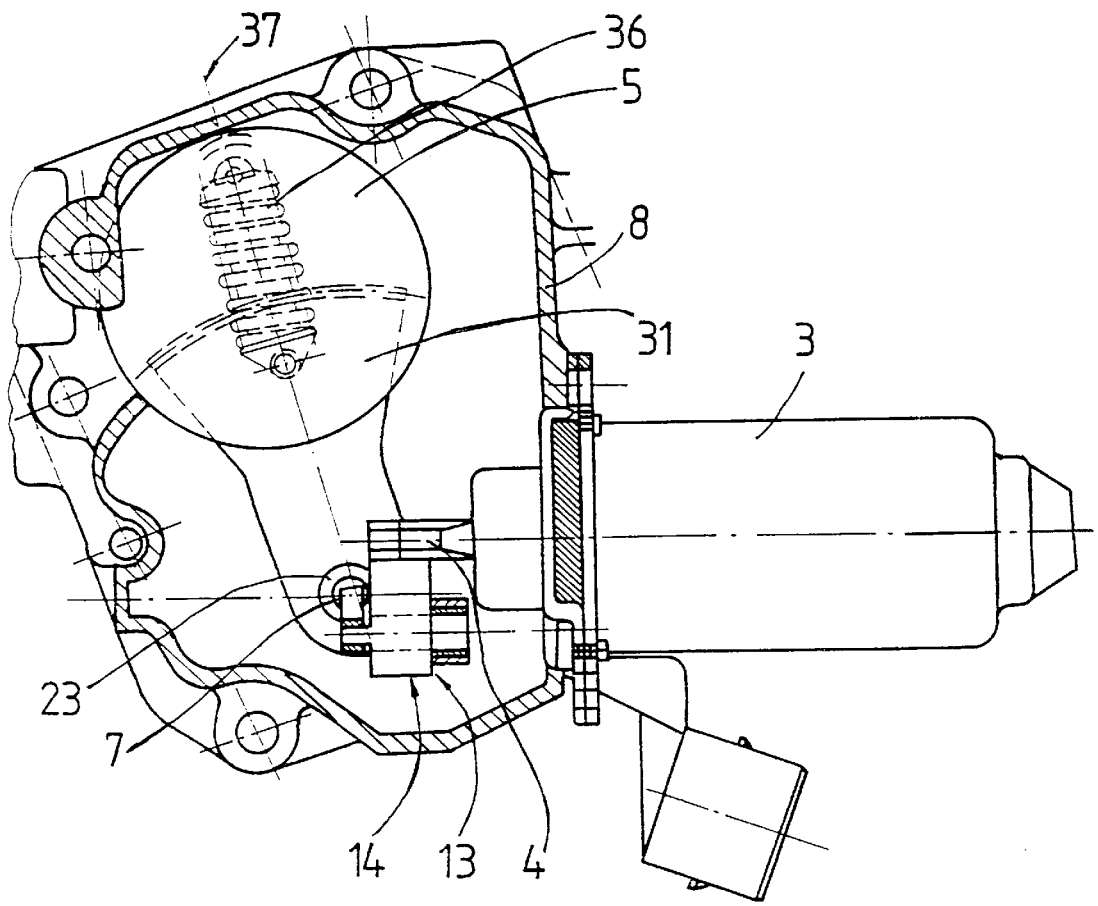
FIG. 10 is a sectional view of the positioning device of FIG. 9 along line X—X.

FIG. 6 shows a positioning device 1 that has a lifting magnet 21 in place of the first drive 3. The end of the sliding element 7 extends into the lifting magnet 21. The opposite end, which has an axial projection 150, is acted upon by a reset spring 19. When current is provided to the lifting magnet 21, the sliding element 7 is moved linearly against the force of the reset spring 19 depending upon the applied current or voltage. Channel selection is carried out by means of the lifting magnet 21. If channel selection is carried out by a rotational movement in a transmission connected after this, as shown in FIGS. 7 and 8, then a driven part 22 of the lifting magnet 21 acts upon a reversing lever 30; which is fixedly connected to the gearshift lever shaft 10. The reset spring 19, which ensures a force-locking connection between the reversing lever 30 and the driven part 22 of the lifting magnet 21, is provided on the side opposite to the lifting magnet 21. When the lifting magnet 21 is activated, its driven part 22 is deflected against the reset force of the reset spring 19 that acts upon the reversing lever 30. The positioning device 1 shown in FIGS. 9 and 10 corresponds substantially to the positioning device shown in FIGS. 1 and 2, but has, in addition, a compensation spring 36, which is associated with the segmental gear wheel 31. The compensation spring 36 is fixedly connected to the segmental gear wheel 31, which can be rotary-driven by means of the second drive 5, and rests against the housing 8 of the positioning device 1. The compensation spring 36 has maximum prestress in the middle position of the segmental gear wheel 31. Upon deflection of the segmental gear wheel 31 by the second drive 5, the torque supplied by the latter is reinforced by the relaxation of the compensation spring 36. The process of engaging the selected gear is thus supported and speeded up. The segmental gear wheel 31 is again brought to the middle position by means of the second drive 5. The compensation spring is thereby prestressed again. The force needed for this purpose is supplied by the second drive 5. This movement direction is associated with taking out of gear a gear that was previously engaged. Less force is needed to take out a gear than to engage a gear, because no synchronization work must be performed in the transmission. For this reason, the provision of the compensation spring 36 allows the second drive 5 to be used with lower power for engaging a gear.

FIGS. 11 to 14 show a positioning device 1 that has only one positioning drive 2. This positioning drive 2 serves, via a helical gearing 53, to drive a gearshift lever shaft 10 (the output component 9) of the positioning device 1. The helical gearing 53 has a spindle 54 that is driven by the positioning drive 2. The end of the spindle 54 is mounted in the housing 8 and supported by bearing 63. The spindle 54 engages a driven element 55, which is fixedly connected to the gearshift lever shaft 10. The driven element 55 and the gearshift lever shaft 10 can also be embodied as a single piece.

The gearshift lever shaft 10 has associated with it a shift mechanism 49, which encompasses a locking element 50. This locking element 50 is arranged at an end 67 of the gearshift lever shaft 10 facing away from the transmission of the vehicle it is mounted on. The locking element 50 includes a shift drive 59 and a latching element 65, which has a first claw 39 and a second claw 41. The first claw 39 has associated with it first depressions 43, and the second claw 41 has associated with it a second depression 45. The first depressions 43 are embodied axially offset relative to one another and run in the circumferentially on the outer circumference of the gearshift lever shaft 10. The second depression 45 is arranged at the end 67 of the gearshift lever shaft 10. In this example, the second depression is embodied in the shape of a groove and intersects the rotational axis 47 of the gearshift lever shaft 10.

Figure 11:
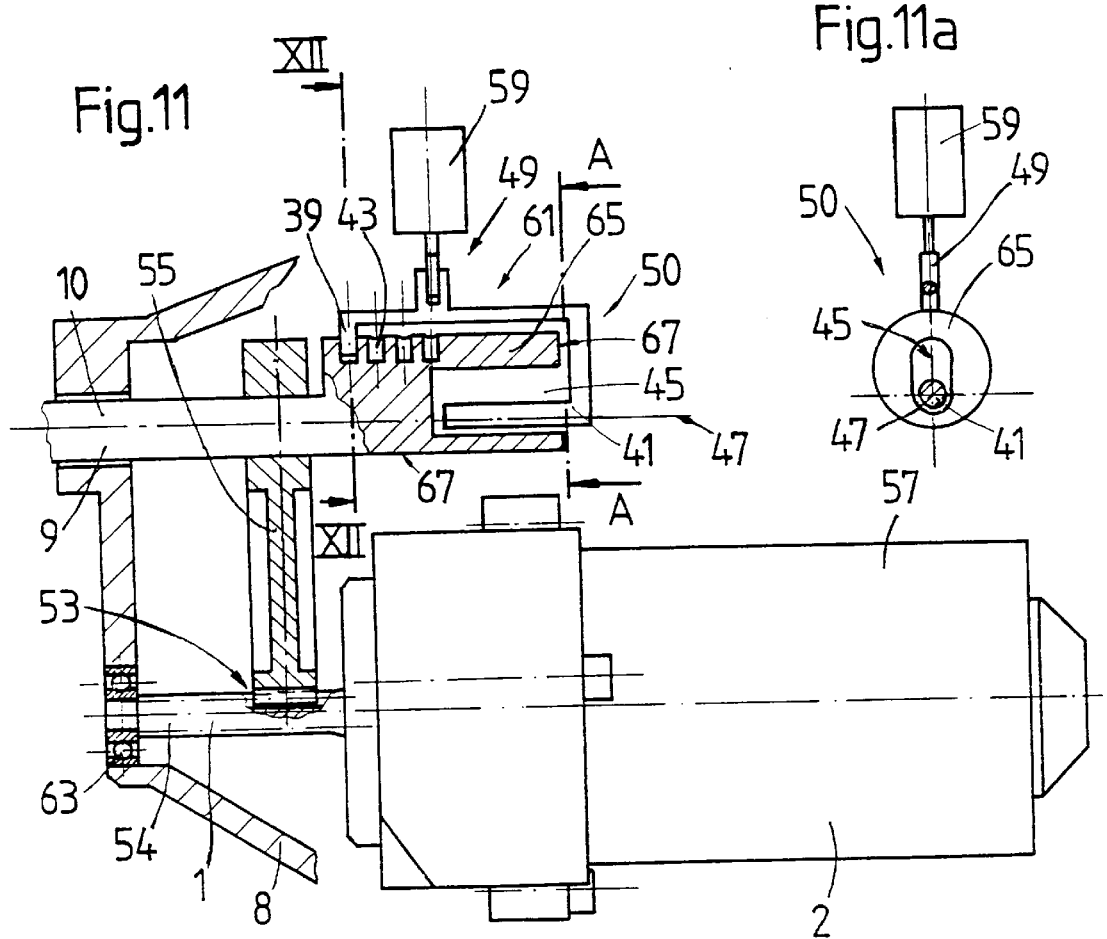
FIG. 11 is an elevational view of another embodiment of the positioning device of the present invention with a shift mechanism and only one positioning drive and one locking element.

By activating the shift drive 59, the latching element 65 can be moved into different operating positions. In this manner, the type of movement on the gearshift lever shaft 10, i.e., axial sliding movement or rotational movement, can be established. In a first operating position, which is shown in FIG. 11, the first claw 39 engages into one of the first depressions 43, as a result of which the gearshift lever shaft 10 linear movement is prevented. When the first claw 39 is latched in, the second claw 41 is placed onto the position of the rotational axis 47 of the gearshift lever shaft 10, allowing the latter to rotate about the rotational axis 47 and the claw 41. Consequently, when spindle 54 is rotated by the positioning drive 2, rotational movement of the gearshift lever shaft 10 is produced.

In a second operating position, the first claw 39 is withdrawn from the first depressions 43. The second claw 41 is located in a position that differs from that of the rotational axis 47 of the gearshift lever shaft 10. In this position, the second claw 41 is engaged with the second depression 45 without play in the circumferential direction. When spindle 54 is rotated by the positioning drive 2, a linear movement is transmitted to the gearshift lever shaft 10, because the helical gearing 53 of spindle 54 has a slope in the axial direction.

Figure 12:
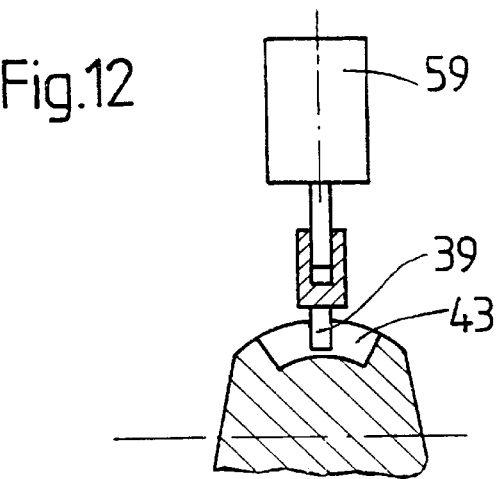
FIG. 12 is a sectional view of the positioning device of FIG. 11 along Line XII—XII.

FIG. 12 shows a sectional view of the shift drive 59 and the first claw 39 engaged into one of the first depressions 43. The rotation of the gearshift lever shaft 10 is permitted, when there is axial locking, by the extension of the first depression 43 in the circumferential direction.

Figure 13:
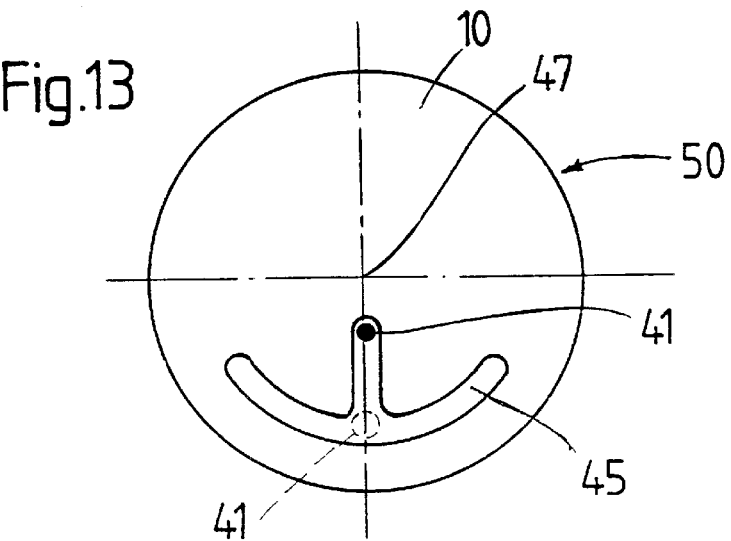
FIG. 13 shows a rotary locking element.
Figure 14:
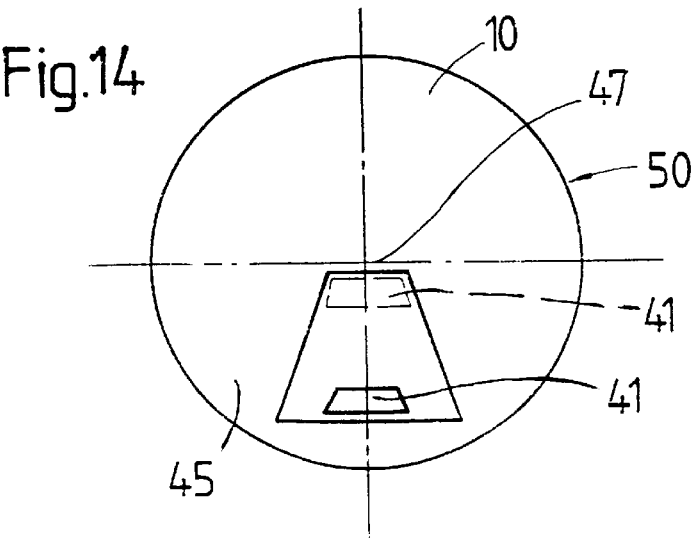
FIG. 14 shows another embodiment of the rotary locking element of FIG. 13.

FIGS. 13 and 14 show partial views of further examples of locking elements 50. To block the rotational movement of the gearshift lever shaft 10, these locking elements 50 are equipped with a device unlike that in FIG. 11. In FIG. 13, the second depression does not intersect the rotational axis 47 of the gearshift lever shaft 10. For this reason, the second depression 45, for the purpose of allowing rotary movement on a section of its radial extension, is embodied with an expansion in the circumferential direction. In the operating position in which rotary movements of the gearshift lever shaft 10 can be produced by means of the positioning drive 2, the second claw 41 is engaged with the expansion of the second depression 45 at the position shown in dashed-dotted lines in FIG. 13. The locking element shown in FIG. 14 has a second claw 41 shaped like a trapezoid. This claw 41 is engaged with the second depression 45, which is also shaped like a trapezoid. The play in the circumferential direction between the second claw 41 and the second depression 45 can be adjusted by the radial position of the claw 41. If the second claw 41 and the second depression 45 are engaged without play, as shown in FIG. 14 in dashed lines, then the gearshift lever shaft is blocked against a rotational movement.

Figure 15:
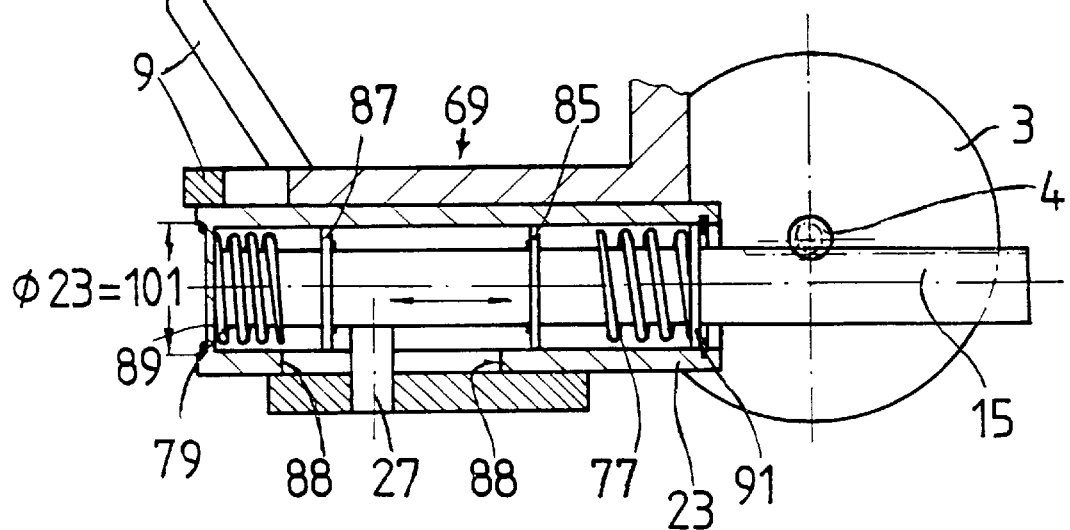
FIG. 15 shows an overload protection with elastic elements.

FIG. 15 shows a section of the positioning unit. A design for transmitting the movement initiated by the first drive 3 is shown. The design shown differs from that in FIG. 1 in that FIG. 15 includes an overload protection 69. The basic function described in reference to FIG. 1 remains unchanged.

The overload protection shown in FIG. 15 has elastic elements. These elastic elements are spring elements 77, 79, which are coaxially mounted over the sliding element 7. The spring elements 77 and 79 are in turn coaxially surrounded by the sleeve 23, which is used for mounting the segmental gear wheel 31 (the segmental gear wheel is not shown in FIG. 15). The spring elements 77, 79 are arranged at the respective ends in the sleeve 23. The sliding element 7 is equipped with projections 85, 87 that form radial support surfaces for the spring elements 77, 79. These radial projections 85, 87 serve to enlarge the diameter of the sliding element 7, but only to such an extent that this diameter remains smaller than the inner diameter 101 of the sleeve 23. The ends of sleeve 23 have projections 89, 91 formed by rings and pointing radially inward, each of which constitutes a second support surface for the spring elements 77, 79.

If faulty control of the drive 3 occurs and the sliding element 7 is moved farther than normal in a deflected direction, then the projection 87 of the sliding element 7, for example, comes into active contact with the spring element 79. The kinetic energy of the sliding element 7 is converted at least partially into deformation energy of the pressurized spring element 79, and the sliding element 7 is slowed down. As a result, the radial projection 27 is prevented from hitting the stop 88.

Figure 16:
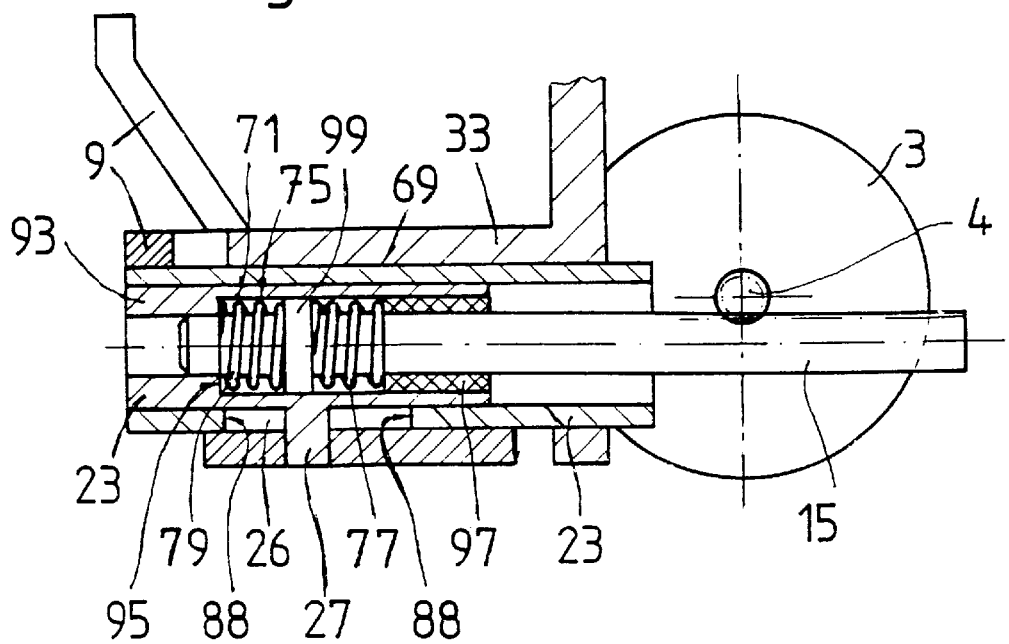
FIG. 16 shows an overload protection with prestressed spring elements.

The design shown in FIG. 16 has the overload projection 69 with a different embodiment of stop absorption. This example has an intermediate sleeve 93, in which the spring elements 77, 79 are arranged. The spring elements 77, 79 are clamped in the intermediate sleeve 93. The sliding element 7 here is formed by the gear rack 15 and the intermediate sleeve 93, and the stop absorption is integrated into this sliding element 7. On the end facing away from the drive, the intermediate sleeve 93 has projections 95 directed radially inward, which constitute a support surface for a first spring element 79. The first spring element 79 is placed into the intermediate sleeve. The gear rack 15, which has a projection 99 that runs radially and coaxially and forms support surfaces for the spring elements 77, is inserted. The second spring element, which faces the drive 3, is slid onto the gear rack 15, and the intermediate sleeve 93 is closed at the end, e.g, by shrinkage of a closing ring 97. The spring elements 77, 79 are enclosed in the intermediate sleeve 93. Upon closing, the spring elements 77, 79 can be prestressed in a predetermined manner by the axial insertion depth of the closing ring 97. If soft springs are used, these are provided with a prestress such that, under normal operating conditions, the springs will form a rigid connection between the gear rack 15 and the intermediate sleeve 93. If the radial projection 27 hits a stop 88, then the kinetic energy of the gear rack 15 is at least partially converted into potential energy of the pressurized spring element, and a relative movement begins between the gear rack 15 and the intermediate sleeve 93.

Figure 17:
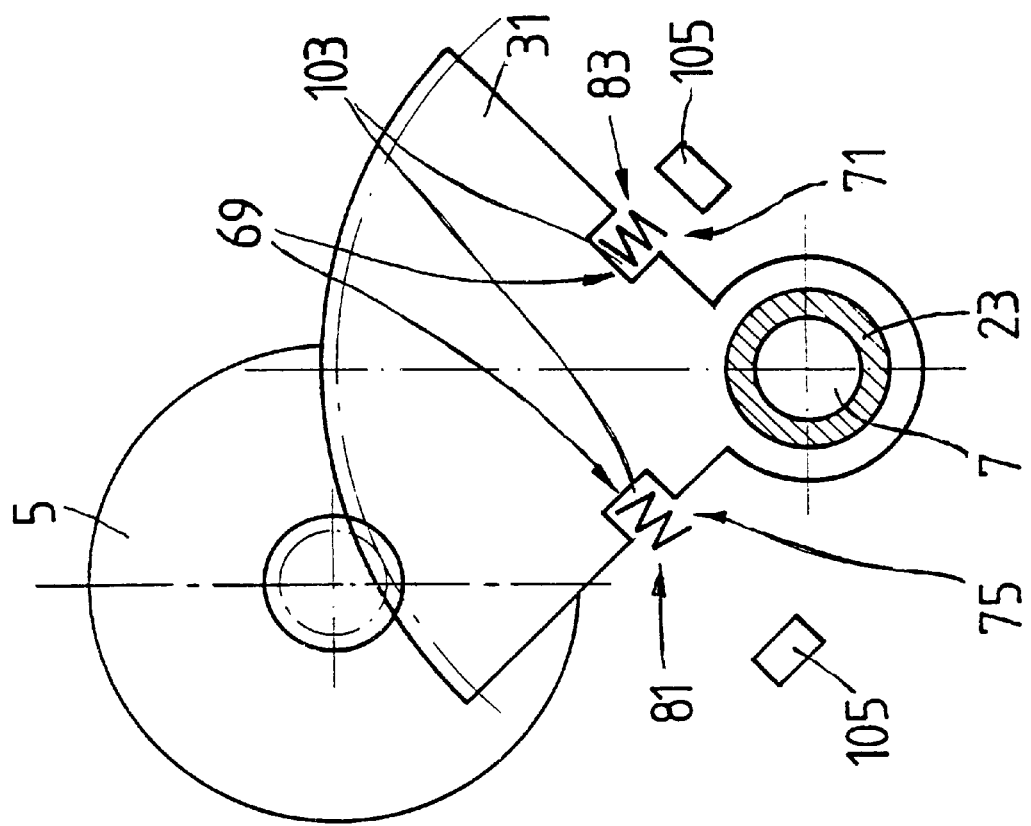
FIG. 17 shows a segmental gear wheel with a stop absorption as overload protection.

FIG. 17 shows a segmental gear wheel 31 equipped with stop absorption as the overload protection. The maximum deflection angle of the segmental gear wheel is limited on both sides by stops 105. The segmental gear wheel 31 is equipped at the level of the stops with an opening 103 to accommodate spring elements 81, 83, which extend out over the limiting edges, which run in the radial direction, of the segmental gear wheel 31. If faulty operation of the drive 5 occurs and the segmental gear wheel 31 is deflected farther than usual, then the spring element arranged on the corresponding side, e.g., 81, comes into active connection with the stop 105 associated with this spring element. The kinetic energy of the segmental gear wheel 31 is converted into deformation energy of the pressurized spring element 81, as a result of which the segmental gear wheel 31 can reach the stop only in decelerated movement form.

FIGS. 18 and 19 show a segmental gear wheel 31, which includes an overload protection 69 with spring elements. The segmental gear wheel 31 has an opening 109 to accommodate an inner segmental wheel part 107. The segmental gear wheel 31 and the inner segmental wheel part 107 are connected via two spring elements 81, 83 arranged tangentially between both sides of the inner segmental wheel part 107 and inner sides of the segmental gear wheel 31. The inner segmental wheel part 107 is mounted rotatably on the sleeve 23, its rotatability being ensured by means of a slide bearing 111, and has an axial projection 33 engaging into the slot of the output component 9 (not shown in FIG. 18). The segmental gear wheel 31 is rotatably mounted on inner segmental wheel part 107, coaxially encompassing a partial section thereof. The spring elements 81, 83 have a spring constant such that, given correct positioning of the drive 5, a rotation-proof connection is ensured between the segmental gear wheel 31 and the inner segmental wheel part 107.

The function of this overload protection is described as follows: As the result of faulty control of the drive 5, the inner segmental wheel part 107 can strike one of the stops arranged in the transmission. When the inner segmental wheel part 107 reaches the stop, its further rotation is prevented. The drive 5 continues to drive the segmental gear wheel 31. The kinetic energy of the segmental gear wheel 31 is converted into deformation energy of at least one of the spring elements 81, 83, and a relative movement begins between the inner segmental wheel part 107 and the segmental gear wheel 31. If the springs of the spring elements 81, 83 are fixedly connected to the inner segmental wheel part 107 on one side and, at the opposite end, are connected fixedly to the segmental gear wheel 31, then both spring elements 81, 83 absorb stress energy when the inner segmental wheel part 107 reaches a stop, the first spring element being stretched and the other being compressed. Other possible embodiments of stop absorptions for segmental gear wheels are known, for example, from DE 195 25 840 C1.

FIG. 20 shows the positioning device 1 with a flange 117 to be connected to a transmission. This flange 117 has an aperture 121 for the inflow and outflow of transmission oil. Another aperture for a speed sensor 125 extends into the transmission to detect the main gearshaft speed is embodied as a further auxiliary element 119. In this example, a temperature sensor 127 extends only into the housing 8 of the positioning device 1. However, it is possible to have this temperature sensor 127 extend into the transmission through yet another aperture in the flange 117 provided for this purpose. The temperature value is transmitted to a control device for controlling an automatic gearshift. Since the positioning force required to engage a gear increases as the temperature decreases, the control device can position the drives taking into account the temperature prevailing in the transmission. In this example, the drive 5 is equipped with a slip clutch 73. Such a slip clutch 73 can also be integrated into the drive housing or into the electric motor 57. Furthermore, this positioning device is equipped with a plurality of sensors 129, 131 for detecting the positioning movement initiated by the drives. The second drive 5 has, at its free end, a manual positioning device 133 for the manual positioning of the output element of the second drive 5. This manual positioning device 133 is realized by equipping an end of the motor shaft 135 with a projection engagable by a tool. This end of the motor shaft 135 is covered by a cover element 139 in the motor housing of the second drive 5.

The function of the manual positioning device is required in the following situations: When a vehicle is disabled while in gear and with an engaged clutch, it cannot be towed by a pulling vehicle; When the electronic system fails, the driver is unable to set the transmission position; and When the vehicle is equipped with an EKS and the clutch is engaged, the driver is not able to shift into a non-loaded gear. The manual positioning device is provided for these cases. The driver is now able, by opening the hood and removing the cover element, to manually place the transmission into a neutral position, in which the gear is shifted in loadless fashion, by manual operation of the motor shaft 135. The neutral position, here the idle position, is recognizable by the driver by positioning forces to be applied. However, it is also possible, upon identifying the gear, to set an positioning manner for the manual removal of the gear.

The invention is not limited by the embodiments described above which are presented as examples only but can be modified in various ways within the scope of protection defined by the appended patent claims.

We claim:

1. A device for positioning an output component for shifting gears in a transmission of a motor vehicle using two types of movement, comprising:

a housing;

a sliding element having a longitudinal axis slidably mounted on the housing for movement along the longitudinal axis;

a first drive being mounted on the housing and operatively connected to the sliding element for moving the sliding element along the longitudinal axis;

the sliding element being axially fixed to the output component such that the output component moves with the sliding element along the longitudinal axis in a first of the two types of movement;

the output component being movable in a circumferential direction relative to the sliding element;

a second drive being mounted on the housing and operatively connected to the output component for moving the output component in a second of the two types of movement;

the output component being axially movable and rotation-proof relative to the second drive;

a sleeve mounted on the housing;

the sliding element being slidably mounted in the sleeve;

the sleeve having a recess extending along the sliding direction; and a radial projection of the sliding element penetrating the recess and being connected to the output component.

2. The device of claim 1, wherein the first drive operates in a rotary movement and a transmission element connects the first drive to the sliding element, the transmission element converting the rotary movement of the first drive into a linear movement of the sliding element.

3. The device of claim 2, wherein the transmission element comprises a crank gear, and the crank gear is connected to the sliding element.

4. The device of claim 2, wherein the transmission element comprises a gear rack connected to the sliding element and engaged with an output element of the first drive.

5. The device of claim 2, wherein the transmission element comprises a cam gear connected to the sliding element.

6. The device of claim 2, further comprising a reset spring for urging the sliding element against the transmission element.

7. The device of claim 1, wherein the first drive further comprises a lifting magnet; and the lifting magnet operatively connected to a driven part connected to the sliding element for moving the sliding element.

8. The device of claim 1, further comprising a gear wheel operatively connecting the second drive to the output component, the gear wheel rotatably mounted on the sleeve; and the output component being rotation-proof but axially movable with respect to the gear wheel.

9. The device of claim 1, further comprising a segmental gear wheel operatively connecting the second drive to the output component, the segmental gear wheel rotatably mounted on the sleeve; and the output component being rotation-proof but axially movable with respect to the segmental gear wheel.

10. The device of claim 1, wherein the second drive further comprises a compensation spring; and the compensation spring having a maximum prestress in a rest position of the drive such that when the drive is displaced from the rest position, the spring reinforces, by relaxation, the torque supplied by the second drive.

11. The device of claim 1, wherein at least one of the first drive and the second drive further comprises an overload protection operatively connected to the at least one of the first drive and the second drive for preventing the transmission of the drive movement of a transmission element when a stop associated with the transmission element is reached.

12. The device of claim 11, wherein the overload protection comprises a slip clutch which is activated when a stop is reached by continued driving of the transmission element in the prevailing movement direction.

13. The device of claim 11, wherein the overload protection comprises elastic elements that, when a preset deflection position is exceeded, experience deformation counter to the force initiated by the at least one of the first drive and the second drive for absorbing the movement of the transmission element.

14. The device of claim 1, wherein each of the first drive and the second drive comprises an electric motor.

15. The device of claim 1, wherein the housing comprises a flange to be connected to a transmission of a motor vehicle; and the flange is operatively connected to accommodate auxiliary elements for performing further functions.

16. The device of claim 15, wherein one of the auxiliary elements comprises at least one aperture for the inflow and outflow of transmission oil, the aperture further comprising a closing element for selectively closing and opening the aperture.

17. The device of claim 15, wherein the auxiliary elements comprise a temperature sensor and a speed sensor for detecting the main gearshaft speed.

18. The device of claim 1, wherein at least one of the first drive and the second drive further comprises a manual device operatively connected to the one of the first drive and the second drive for permitting a manual adjustment of the output component.

19. The device of claim 1, wherein the second drive comprises a manual device operatively connected for manually driving a motor shaft fixedly connected to an output element of the second drive.

20. The device of claim 19, wherein the motor shaft comprises a section, at one end, into which engages a corresponding section of a positioning element used by the manual device.

* * * * *